United States Patent
Zandiyeh et al.

(10) Patent No.: US 9,366,597 B2
(45) Date of Patent: Jun. 14, 2016

(54) LEAK DETECTOR

(75) Inventors: Ali Reza Kambiez Zandiyeh, Louth (GB); Paul Staton, Grimsby (GB)

(73) Assignee: Dunlop Oil & Marine Limited, Grimsby (GB)

( * ) Notice: Subject to any disclaimer, the term of this patent is extended or adjusted under 35 U.S.C. 154(b) by 354 days.

(21) Appl. No.: 13/700,632

(22) PCT Filed: May 31, 2011

(86) PCT No.: PCT/GB2011/051027
§ 371 (c)(1),
(2), (4) Date: Jan. 7, 2013

(87) PCT Pub. No.: WO2011/151643
PCT Pub. Date: Dec. 8, 2011

(65) Prior Publication Data
US 2013/0220466 A1    Aug. 29, 2013

(30) Foreign Application Priority Data

Jun. 1, 2010  (GB) .................................. 1009042.1

(51) Int. Cl.
| | |
|---|---|
| *G01M 3/38* | (2006.01) |
| *F16L 55/00* | (2006.01) |
| *G01M 3/04* | (2006.01) |
| *F16L 1/11* | (2006.01) |
| *F16L 11/12* | (2006.01) |
| *G01M 3/26* | (2006.01) |

(52) U.S. Cl.
CPC .................. *G01M 3/38* (2013.01); *F16L 55/00* (2013.01); *G01M 3/047* (2013.01); *F16L 1/11* (2013.01); *F16L 11/12* (2013.01); *G01M 3/04* (2013.01); *G01M 3/26* (2013.01)

(58) Field of Classification Search
CPC ............. F16L 11/12; F16L 1/11; F16L 55/00; G01M 3/04; G01M 3/26; G01M 3/38; G01M 3/047
USPC .......................... 138/103–104; 73/40, 40.5 R
See application file for complete search history.

(56) References Cited

U.S. PATENT DOCUMENTS 5,551,484 A * 9/1996 Charboneau .................. 138/104
5,744,794 A * 4/1998 Michie et al. ............ 250/227.16

(Continued)

FOREIGN PATENT DOCUMENTS

CN    2331812 Y    8/1999
CN    101105263 A   1/2008

(Continued)

OTHER PUBLICATIONS

Search Report Under Section 17(5) mailed Aug. 20, 2010 for UK Application No. GB1009042.1.

(Continued)

*Primary Examiner* — Frederick C Nicolas
(74) *Attorney, Agent, or Firm* — Wegman, Hessler & Vanderburg

(57) ABSTRACT

A leak-detecting sensor device (120) for a hose section (105) comprises a sensor (145a, b). The sensor (145a, b) comprises an optical fiber arranged to react to the presence of a fluid. The sensor (145a, b) is housed in a protective sleeve that is arranged for expansion and contraction when the hose section (105) expands and contracts, respectively. A tension mechanism connects a first end of the sensor to the protective sleeve and is arranged to tension the sensor within the sleeve.

12 Claims, 4 Drawing Sheets

(56) References Cited

U.S. PATENT DOCUMENTS

Figure 1:
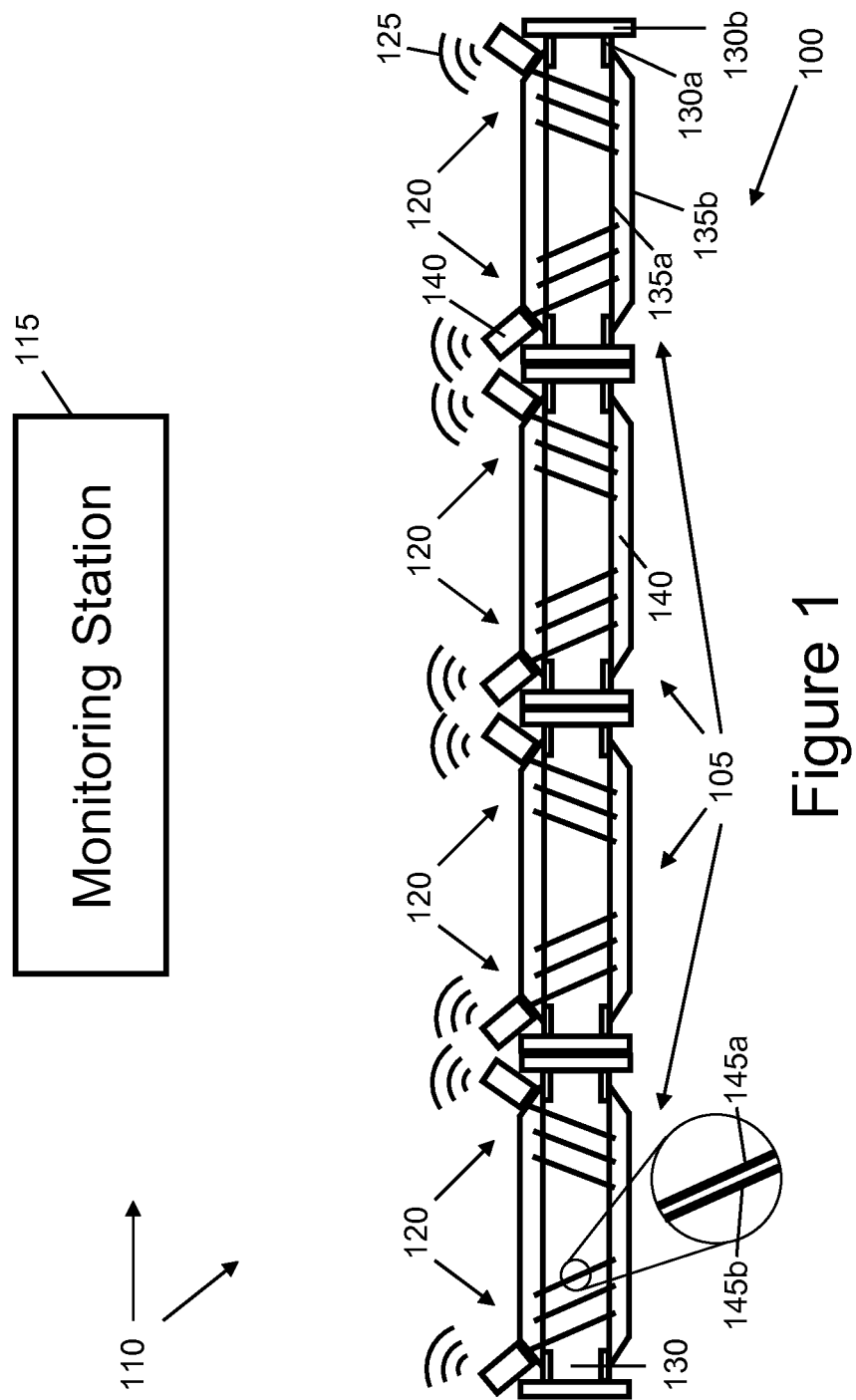

| | | | |
|---|---|---|---|
| 7,509,841 B2 | 3/2009 | Spaolonzi et al. | |
| 8,064,738 B2 * | 11/2011 | Zandiyeh et al. | 385/12 |
| 8,640,527 B2 * | 2/2014 | Hara | 73/52 |

FOREIGN PATENT DOCUMENTS

| | | | |
|---|---|---|---|
| EP | 1 795 879 A2 | 6/2007 | |
| GB | 2 100 420 A | 12/1982 | |
| JP | 6018754 A | 1/1994 | |
| JP | H1010392 A | 1/1998 | |
| JP | 3916777 B | 3/2000 | |
| WO | WO 2007/087720 A1 | 8/2007 | |
| WO | WO 2007/119056 A1 | 10/2007 | |

OTHER PUBLICATIONS

International Search Report and Written Opinion mailed Nov. 30, 2011 for PCT/GB2011/051027 filed May 31, 2011.
International Preliminary Report on Patentability mailed Dec. 4, 2012 for PCT/GB2011/051027 filed May 31, 2011.
Japanese Office Action mailed Oct. 23, 2014 for Japanese Patent Application No. JP 2013-512990.
Chinese Office Action issued Jul. 28, 2014 for Chinese Patent Application No. 201180037711.0.
Chinese (Second) Office Action issued Apr. 3, 2015 for Chinese Patent Application No. 201180037711.0.
Translation of Chinese (Second) Office Action issued Apr. 3, 2015 for Chinese Patent Application No. 201180037711.0.

* cited by examiner

LEAK DETECTOR

CROSS-REFERENCE TO RELATED APPLICATIONS

This application claims the priority filing benefit of International PCT Application PCT/GB2011/051027 filed May 31, 2011 and published under PCT 21(2) in the English language, and Great Britain Patent Application Serial No. 1009042.1 filed Jun. 1, 2010.

The present invention relates to the detection of leaks, in particular the detection of fluid leaks in a hose.

An underwater hose such as an oil hose will experience general wear and tear, and ageing, and may be subjected to other forms of damage. This can result in rupture of the hose causing leakage of the contents of the hose or the ingress of water from outside the hose. Generally, an underwater hose comprises an inner carcass and an outer carcass, either of which may rupture at any point along the hose. Failure of the outer carcass will result in ingress of water and failure of the inner carcass will cause leakage of fluid transported by the hose. Detectors are generally placed at the ends of a hose section and detect a leak once fluid, or water, from the leak reaches the end of the hose section. It is clearly beneficial to detect any leaks as soon as possible and to detect the location and type of leak.

The state of the art includes detectors that use fibre optics mounted in a hose, along its full length, to detect leaks therein. In some detectors the fibre optics are coated with a fluid sensitive material that swells on contact with a fluid, causing the deformation of the fibre optic and thereby affecting its optical characteristics.

The present invention provides a leak-detecting sensor device for a hose section, the device comprising: a sensor comprising an optical fibre and arranged to react to the presence of a fluid; a protective sleeve housing the sensor, arranged for expansion and contraction when the hose section expands and contracts, respectively; and tension means connecting a first end of the sensor to the protective sleeve, arranged to tension the sensor in the protective sleeve.

Optionally, the protective sleeve comprises a coiled elongate member and the tension means comprises biasing means connected to the coil at the first end of the protective sleeve and to the first end of the sensor.

Optionally, the biasing means is positioned within the protective sleeve between the first end of the protective sleeve and the first end of the sensor and is arranged to bias the respective first ends towards each other.

Optionally, the tension means comprises: a thread connecting the first end of the sensor to the biasing means; and a collar arranged to secure the thread to the first end of the sensor.

Optionally, the collar is arranged to contract on exposure to heat thereby securing the thread to the first end of the sensor.

Optionally, the optical fibre comprises at its first end a mirrored surface arranged to reflect back along the optical fibre light that is emitted into a second, opposite end of the optical fibre.

The leak-detecting sensor device may further comprise: optical means arranged to emit light into the optical fibre and detect light from the optical fibre; and processing means operatively connected to the optical means and arranged to process data relating to the detected light.

The leak-detecting sensor device may further comprise a transmitter operatively connected to the processing means and arranged to transmit a signal carrying the processed data.

The leak-detecting sensor device may further comprise a second sensor, wherein the first sensor is arranged to react to the presence of a first fluid and the second sensor is arranged to react to the presence of a second fluid, different from the first fluid.

The invention also provides a hose section, having an inner carcass and an outer carcass, comprising a device according to any preceding claim, the device being fixed relative to a first end of the hose section, wherein the, or each, sensor is arranged between the inner hose carcass and the outer hose carcass of the hose section.

The hose section may further comprise a second sensor device fixed relative to a second end of the hose section, wherein the, or each, sensor of the second device is arranged between the inner hose carcass and the outer hose carcass.

The invention also provides a leak detection system comprising: a leak-detecting sensor device as described above; and monitoring means comprising a detector arranged to receive a signal from the transmitter and means to process the received signal.

Figure 2:
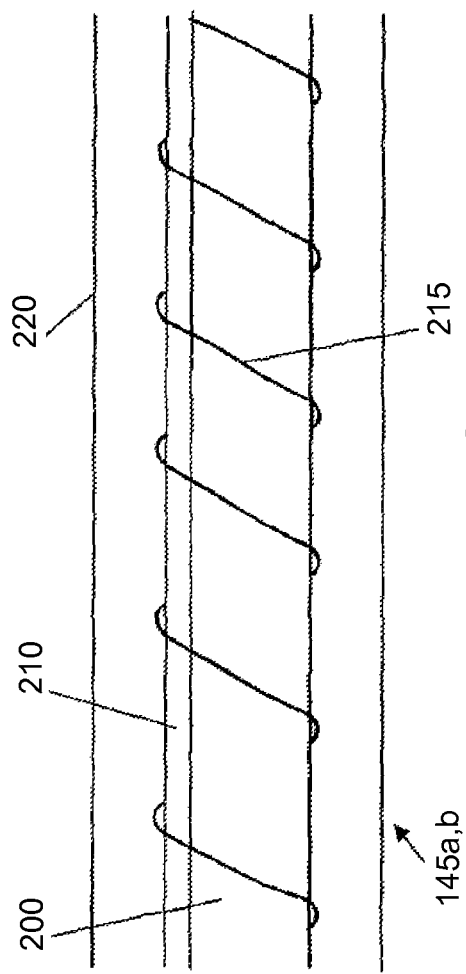
Figure 3:
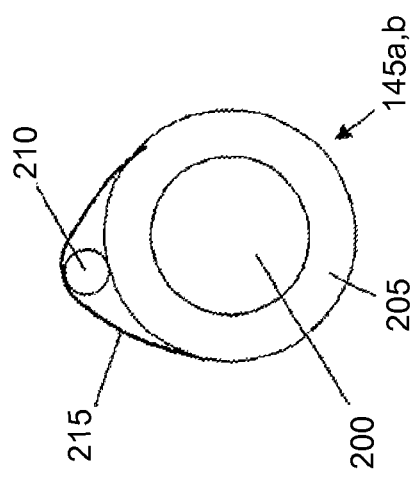
Figure 4:
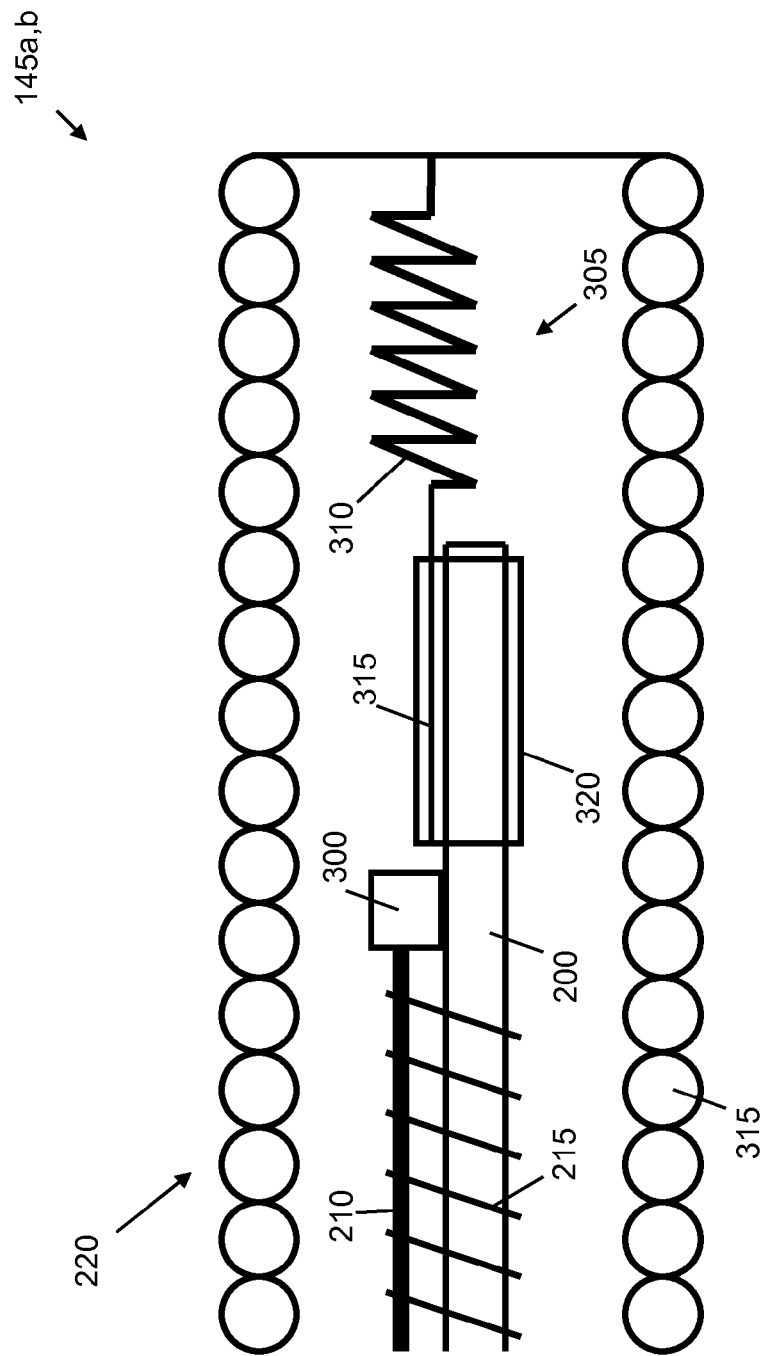
Figure 5:
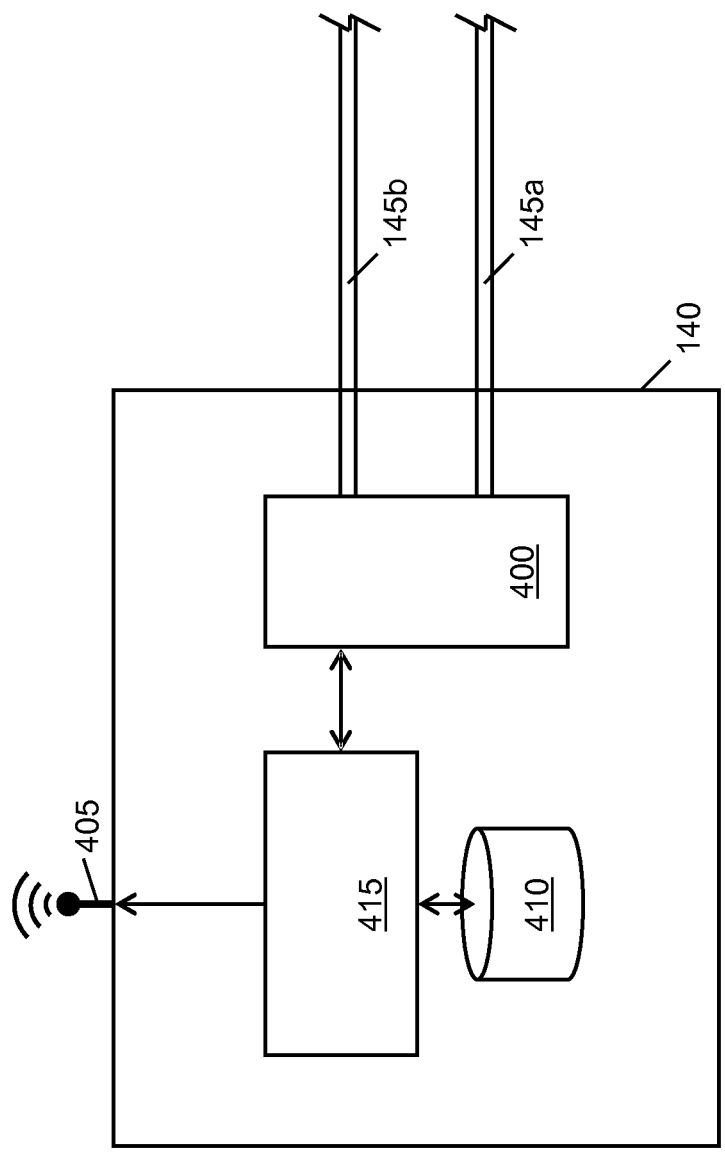

Preferred embodiments of the present invention will now be described by way of example only with reference to the accompanying drawings in which:

FIG. 1 schematically shows a leak detection system according to an embodiment of the invention, fitted to a hose;

FIG. 2 schematically shows one part of a sensor device used in the system of FIG. 1;

FIG. 3 shows a cross-section through the sensor of FIG. 2;

FIG. 4 schematically shows an embodiment of an antibunching mechanism connecting the sensor of FIGS. 2 and 3 to a protective sleeve; and FIG. 5 schematically shows the signal generation, detection and transmission means for the sensor device used in the system of FIG. 1.

Referring to FIG. 1, an underwater hose 100 is formed from connected hose sections 105, and in use is submersed under water. A leak-detection system 110 is made up of a monitoring station 115 and multiple sensor devices 120, two fitted to each hose section 105 in the hose 100. The respective sensor devices 120 communicate independently with the monitoring station 115 via transmitted sonar signals 125. In other embodiments the hose 100 is not submersed (e.g. it floats on the water's surface) and the transmitted signals 125 are electromagnetic signals.

The hose sections 105 are connected to one another at their ends to form the hose 100. At each end of the respective hose sections 105 is a hose end fitting 130 by which the hose sections 105 are connected together. Each end fitting 130 is made up of a tubular portion 130a connected to a flange 130b of larger diameter. Holes are formed through the flange 130b, through which holes the respective end fittings 130 of adjacent hose sections 105 are bolted together for a watertight connection. In each hose section 105, extending between the two end fittings 130, are an inner carcass 135a and an outer carcass 135b. At each end fitting 130, both carcasses 135a,b are sealed to the radially-outer surface of the tubular portion 130a. The outer carcass 135b has a greater diameter than the inner carcass 135a, forming a space 140 between the two.

A sensor device 120 is mounted on each end fitting 130 of the respective hose sections 105. Each sensor device 120 is made up of an interrogation unit 140 and a pair of sensors 145a,b extending from it. The sensors 145a,b extend side-by-side from respective fixed ends, connected to the interrogation unit 140 at the end fitting 130, to respective free ends positioned approximately midway along the length of the hose section 105; they coil around the inner carcass in the space between the inner and outer carcasses. Thus each sensor device 120 fitted to a hose section 105 extends along a respective half of the length of the hose section 105.

Referring to FIGS. 2 and 3, the sensors 145a,b are of a similar construction. One of the pair of sensors 145a,b is used to detect the presence of a hydrocarbon product such as oil and the other to detect the presence of water. Each sensor 145a,b comprises a sensor core 200 coated with a swelling material 205 that expands on contact with a fluid. An optical fibre 210 is bound against the coated sensor core 200 by a relatively inextensible binding material 215, in this case a thread such as Kevlar thread. The free end of the optical fibre 210 is mirrored, in this embodiment by being connected to a mirrored termination block 300 (shown in FIG. 4). If there is a leak in either the inner hose carcass or the outer hose carcass, oil or water will enter the space between the two carcasses i.e. the space in which the sensor 145a,b is located. The oil or water will contact the sensors 145a,b, causing the swelling material 205 of the hydrocarbon sensor 145a,b or the water sensor 145a,b to expand. As the swelling material 205 expands it forces the optical fibre 210 against the binding thread 215, causing localised microbending in the optical fibre 210 at positions along the sensor 145a,b, corresponding to the location of the leak. Use of this microbending to detect the presence of a leak is known in the art. Other sensor devices which exhibit similar responses can be employed.

Referring to FIGS. 2 and 4, each sensor 145a,b is housed within a respective protective sleeve 220 to shield it from being damaged, but which allows water or a hydrocarbon product such as oil from a leak to reach the sensors 145a,b. The protective sleeves 220 and the sensors 145a,b they contain extend from respective fixed ends, which are fixed relative to an end fitting 130, to respective free ends. The free ends are positioned approximately midway along the length of the hose section 105 to which the sensors 145a,b are fitted. The protective sleeve 220, which in this embodiment is a coiled elongate member, is formed as a helically wound flat strip or wire and is made of metal, a sufficiently hard plastic material, or other suitable material. In use, each hose section 105 experiences elongation, expansion and contraction. In its relaxed state there are gaps between each coil of the helical protective sleeve 220 to permit contraction of the protective sleeve 220 as the hose 100 contracts. Similarly, the helical construction of the protective sleeve 220 permits it to be elongated which results in an increase in the sizes of the gaps between the coils. Therefore when a hose section 105 expands or contracts this causes the protective sleeve 220 to expand or contract, generally without causing damage to the protective sleeve 220 because its construction permits such expansion and contraction.

The sensors 145a,b housed within the protective sleeves 220 are inextensible i.e. their construction does not permit them to expand and contract when the protective sleeves 220 do so. Therefore, each sensor 145a,b is housed within the protective sleeve 220 in a manner that permits movement relative to it. That is, as the protective sleeve 220 elongates and contracts there is relative axial sliding movement between the protective sleeve 220 and the sensor 145a,b.

Referring to FIG. 4, in each sensor 145a,b tension means 305 in the form of an anti-bunching mechanism connects the free end of the sensor 145a,b to the free end of the protective sleeve 220 which extends beyond the free end of the sensor core 200. The anti-bunching mechanism 305 is accommodated in the protective sleeve 220 in a space between its free end and the free end of the sensor core 200. It is made up of: a steel extension spring 310 which extends within the sleeve 220 approximately coaxially with it; a Kevlar (or similar material) thread 315; and a heat-shrink collar 320.

The steel extension spring 310 is connected at one end, its sleeve end, to the free end of the protective sleeve 220 and fixed relative to it. At its free end, the final coil of the helical protective sleeve 220 is formed so that it turns radially inwards (not shown) and approximately bisects the longitudinal axis of the protective sleeve 220. A loop (not shown) formed at the sleeve end of the extension spring 310 encircles the inwardly turned final coil and is supported on it where it approximately bisects the longitudinal axis of the protective sleeve 220. The Kevlar thread 315 is tied around a hook (not shown) formed at the other end of the extension spring 310, the sensor end, and connects it to the free end of the sensor 145a,b.

The heat-shrink collar 320 secures the Kevlar thread 315 to the sensor 145a,b, binding it to the surface of the sensor core 200 at a position between its end and the mirrored termination block 300. The heat-shrink collar 320 secures the Kevlar thread 315 to the sensor core 200 over sufficient length to result in a tensile strength of at least 37 Newtons on the Kevlar thread 315.

In use, when the protective sleeve 220 stretches it moves axially with respect to the sensor 145a,b it houses so that the distance between the respective free ends of the sensor 145a,b and the protective sleeve 220 increases. In this event, the extension spring 310 extends and so permits the protective sleeve 220 to elongate without stretching the sensor 145a,b or, as a result, the optical fibre 210. Similarly, the sensor 145a,b, which is unable to shorten (contract axially), moves axially with respect to the protective sleeve 220 when it shortens so that the distance between the respective free ends of the sensor 145a,b and the protective sleeve 220 is decreased. In this event, the extension spring 310 contracts and urges the free end of the sensor towards the free end of the protective sleeve 220. By urging together the respective ends of the sensor and the protective sleeve 220, the anti-bunching mechanism 305 tends to keep the sensor in tension and thus prevent the sensor 145a,b from bunching-up, kinking or bending within the protective sleeve 220. Therefore, the anti-bunching mechanism 305 serves to avoid or at least limit damage to the optical fibre 210, as well as limiting changes in the levels of reflected light, that might occur otherwise due to kinking or bending of the optical fibre 210.

Referring to FIG. 5, the interrogation unit 140 is made up of an optical emitter/detector 400, a sonar transmitter 405, memory 410 and a microprocessor 415 which is operatively connected to all three 400,405,410. In this embodiment the emitter/detector 400 is one device, but other embodiments may instead include respective emitter and detector devices.

In use, each emitter/detector 400 illuminates, either continuously or periodically, the respective optical fibres 210 of the two sensors 145a,b that are connected to it. In each sensor 145a,b, the light travels along the length of the optical fibre 210 towards the mirrored termination block 300. The mirrored termination block 300 reflects this light back along the fibre 210 towards the emitter/detector 400 where it is detected. The microprocessor 415 is connected to the emitter/detector 400 and collects and processes data corresponding to the detected light, and stores it to memory 410. The microprocessor 415 also sends the data via the sonar transmitter 405 to the monitoring station 115. In some embodiments it is transmitted to the monitoring station 115 via a signal repeater and/or a signal converter that converts the transmitted sonar signals 125 into electromagnetic signals. In this embodiment the processed data includes the data corresponding to the detected light, and redundant data associated with data transmission (e.g. data for error correction/detection purposes) as will be appreciated by those skilled in the art. Alternative methods of processing, storing and transmitting data from the emitter/detector will be apparent to those skilled in the art.

As already stated, a leak in a hose section 105 causes microbending at localised positions along the optical fibre 210 of one the sensors 145a,b. At these positions the light escapes from the core of the optical fibre 210 into the outer cladding. This light is therefore lost through attenuation, resulting in a reduction in the amount of light detected by the emitter/detector 400. That is, the intensity of the light detected by the emitter/detector 400 drops as a result of oil or water coming into contact with the swelling material 205. It will be appreciated that detection of oil or water will occur at all points along the optical fibre.

The microprocessor 415 has access to values corresponding to the intensity, or start time, end time, interval between, and duration of the light pulses emitted by the emitter/detector 400, all of which are stored in memory 410. The light detected by the emitter/detector 400 is monitored. The microprocessor 415 processes data on the light detected in a monitored period and stores the processed data to memory 410. Changes in the intensities of detected light in the monitored period correspond to detection of fluids in contact with the sensors. As part of the processing of the detected light, the microprocessor 415 compares intensity values of the detected light over the monitored period with expected intensity values (which are stored in memory 410) for that period. If a detected intensity value drops significantly relative to the expected value with which it is compared, then that indicates that a leak has occurred. The microprocessor 415 stores to memory 410 the magnitudes of the differences between the detected values and the expected values, as well as whether the detected values were greater or less than the expected values. These values are part of the data that is transmitted to the monitoring station 115 i.e. the data corresponding to the detected light.

It will be appreciated that an operator may be alerted to the presence of a leak in a number of different ways. For example, an alarm may sound at the monitoring station 115, or alternatively a signal may be sent to a remote device. The monitoring station 115 may be arranged to sound an alarm in response to certain conditions being met by data it receives. For example, the received data includes the magnitudes of the differences between the detected values and the expected values of light intensity, and the monitoring station 115 may be arranged to identify when these magnitudes exceed a predetermined threshold and sound an alarm or send a signal in response.

In the described embodiments, the hydrocarbon sensor 145a,b comprises a glass reinforced polymer (GRP) sensor core 200 coated with a swelling material 205 such as a heat cured silicone polymer that expands on contact with common hydrocarbon fuels like petrol. The swelling material 205 is extruded or alternatively dip coated onto the sensor core 200 and is applied as a thin coating of between approximately 50 microns and 100 microns. The water sensor 145a,b comprises a similar sensor core 200 coated with a hydrogel swelling material 205 that swells on contact with water. The hydrogel is a poly(ethylene oxide)-copoly(propylene oxide) (PEO/PPO) block copolymer polyurethaneurea (PUU). The ratio of the PEO to PPO alters the swelling and physical characteristics of the swelling material 205. The ratios of the components are therefore chosen to provide maximum swelling on contact with water while still maintaining optimal physical strength. These materials can be re-used to detect the same fluid again once they have fully dried out.

It will be appreciated that in modifications/alternatives to the described embodiments other sensor designs which work on the principle of microbending can be employed and any other suitable materials that display similar physical characteristics may be used for the detection of hydrocarbons or water. Additional sensors may be included in the detector device 120 to facilitate the detection of more than two different fluids. For the detection of heavier fuels and oils, other rubber compounds such as Butyl rubber and EPDM may replace the silicone. The presence of other fluids such as gases may also be detected by using any suitable material that can be coated onto the sensor core 200 and that experiences a predictable volumetric change when in contact with a particular fluid.

In the foregoing description of exemplary embodiments, each sensor device 120 included two sensors 145a,b that coil around the inner carcass 135a. In modifications to the described embodiments, or in alternative embodiments, the sensors may extend axially along the length of the hose section between its ends, doubling back one or more times so that different portions of the sensors lie adjacent and parallel one another. In other embodiments, each sensor device may comprise only one sensor and it may extend from one end of the space between carcasses to the other. In such an arrangement, the respective sensor devices at opposite ends of a hose section may each be arranged to detect a different fluid, and the sensors may coil past each other along the full length of the space between the carcasses.

In modifications to the described embodiments, the mirrored termination block 300 may be replaced by a mirrored finish to the optical fibre 210.

In modifications to the described embodiments, the steel tension spring 310 may be replaced by an elastic member or any other suitable biasing means as will be readily appreciated by those skilled in the art.

In modifications to the described embodiments, the Kevlar thread 315 may be replaced by a wire/thread of any suitable material such as steel or a plastics material. Alternatively it may be omitted altogether and the spring 310 or other suitable biasing means may be connected directly to the sensor core 200.

In modifications to the described embodiments, the heatshrink collar 320 may be replaced by any means suitable for fixing the thread 315 (or alternatives), or alternatively the spring/biasing means, to the sensor core. Suitable means may include a closable metal collar such as a jubilee clip, or it may include screws, rivets etc. driven into the sensor core 200. The skilled person will no doubt appreciate other suitable means.

In the described embodiments or modifications/alternatives to them, the microprocessor 415 can be any suitable, preferably low power, processor such as an ARM7TDMI or the like. The memory 410 to which it is connected may be on- or off-chip memory in any suitable arrangement; it need only be suitable for storage and retrieval of data as described above.

In modifications to the described embodiments, some or all of the processing performed by the microprocessor 415 may be performed at the monitoring station 115. For example, the microprocessor 415 may simply be operable to take data from the emitter/detector 400 and transmit it via the transmitter 405 to the monitoring console 115 where it is analysed (e.g. compared with expected intensity values).

The invention claimed is:

1. A leak-detecting sensor device for a hose section, the device comprising:
   a sensor comprising an optical fibre, the sensor adapted to react to the presence of a fluid;
   a protective sleeve housing the sensor, the protective sleeve adapted for expansion and contraction when the hose section expands and contracts, respectively; and tension means connecting a first end of the sensor to the protective sleeve, the tension means adapted to tension the sensor in the protective sleeve.

2. A hose section, having an inner carcass and an outer carcass, comprising a device according to claim 1, the device being fixed relative to a first end of the hose section, wherein the or each sensor is arranged between the inner hose carcass and the outer hose carcass of the hose section.

3. A hose section according to claim 2, further comprising a second sensor device fixed relative to a second end of the hose section, wherein the or each sensor of the second device is arranged between the inner hose carcass and the outer hose carcass.

4. A leak-detecting sensor device for a hose section, the device comprising:
   a sensor comprising an optical fibre and arranged to react to the presence of a fluid;
   a protective sleeve housing the sensor, arranged for expansion and contraction when the hose section expands and contracts, respectively, wherein the protective sleeve comprises a coiled elongate member; and
   tension means connecting a first end of the sensor to the protective sleeve, arranged to tension the sensor in the protective sleeve, wherein the tension means comprises biasing means connected to the coiled elongate member at the first end of the protective sleeve and to the first end of the sensor.

5. A device according to claim 4, wherein the biasing means is positioned within the protective sleeve between the first end of the protective sleeve and the first end of the sensor and is arranged to bias the respective first ends towards each other.

6. A leak-detecting sensor device for a hose section, the device comprising:
   a sensor comprising an optical fibre and arranged to react to the presence of a fluid;
   a protective sleeve housing the sensor, wherein the protective sleeve comprises a coiled elongate member arranged for expansion and contraction when the hose section expands and contracts, respectively; and
   tension means connecting a first end of the sensor to the protective sleeve, arranged to tension the sensor in the protective sleeve, wherein the tension means comprises biasing means connected to the coiled elongate member at a first end of the protective sleeve and to the first end of the sensor, a thread connecting the first end of the sensor to the biasing means, and a collar arranged to secure the thread to the first end of the sensor.

7. A device according to claim 6, wherein the collar is arranged to contract on exposure to heat thereby securing the thread to the first end of the sensor.

8. A leak-detecting sensor device for a hose section, the device comprising:
   a sensor comprising an optical fibre and arranged to react to the presence of a fluid, wherein the optical fibre comprises at a first end a mirrored surface arranged to reflect back along the optical fibre light that is emitted into the optical fibre;
   a protective sleeve housing the sensor, arranged for expansion and contraction when the hose section expands and contracts, respectively; and
   tension means connecting a first end of the sensor to the protective sleeve, arranged to tension the sensor in the protective sleeve.

9. A leak-detecting sensor device for a hose section, the device comprising:
   a sensor comprising an optical fibre and arranged to react to the presence of a fluid;
   a protective sleeve housing the sensor, arranged for expansion and contraction when the hose section expands and contracts, respectively;
   tension means connecting a first end of the sensor to the protective sleeve, arranged to tension the sensor in the protective sleeve;
   optical means arranged to emit light into the optical fibre and detect light from the optical fibre; and
   processing means operatively connected to the optical means and arranged to process data relating to the detected light.

10. A device according to claim 9, further comprising a transmitter operatively connected to the processing means and arranged to transmit a signal carrying the processed data.

11. A device according to claim 9, further comprising a second sensor, wherein the first sensor is arranged to react to the presence of a first fluid and the second sensor is arranged to react to the presence of a second fluid, different from the first fluid.

12. A leak detection system comprising:
   a sensor comprising an optical fibre and arranged to react to the presence of a fluid;
   a protective sleeve housing the sensor, arranged for expansion and contraction when the hose section expands and contracts, respectively;
   tension means connecting a first end of the sensor to the protective sleeve, arranged to tension the sensor in the protective sleeve;
   optical means arranged to emit light into the optical fibre and detect light from the optical fibre;
   processing means operatively connected to the optical means and arranged to process data relating to the detected light;
   a transmitter operatively connected to the processing means; and
   monitoring means comprising a detector arranged to receive a signal from the transmitter and means to process the received signal.

* * * * *